Aug. 9, 1927.  
T. ROBINSON  
1,638,746  
ROOFING ELEMENT  
Filed June 26, 1924  
4 Sheets-Sheet 1
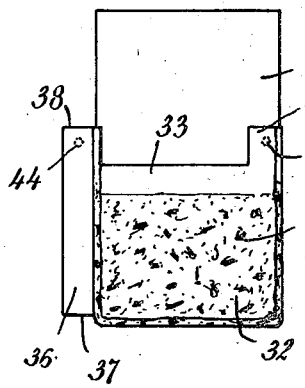
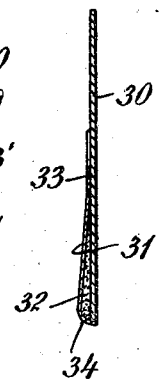
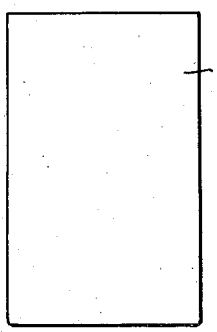
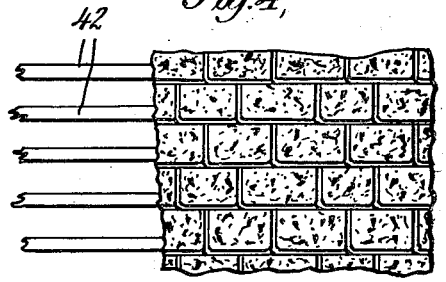
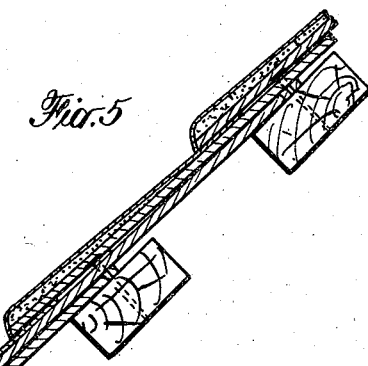
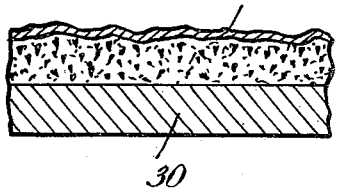
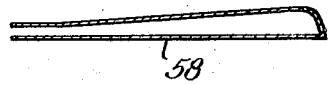

Aug. 9, 1927.
T. ROBINSON
ROOFING ELEMENT
Filed June 26, 1924     4 Sheets-Sheet 2
1,638,746
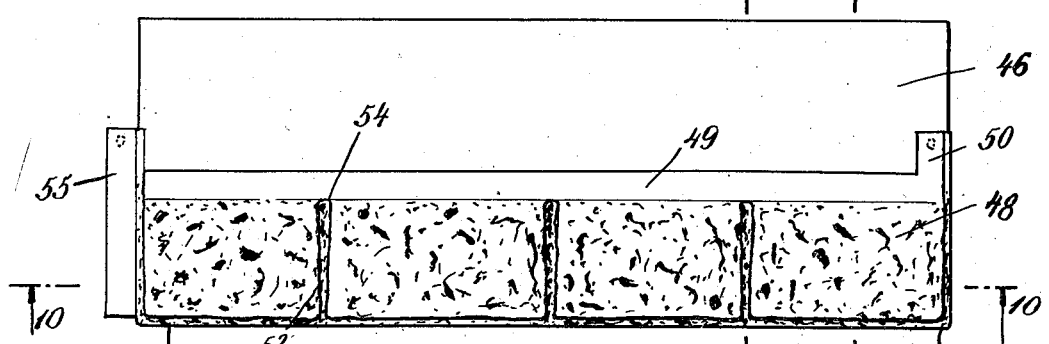
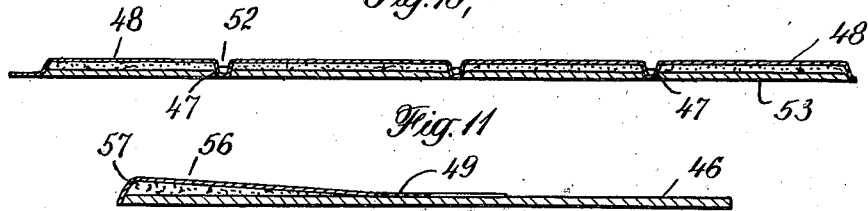
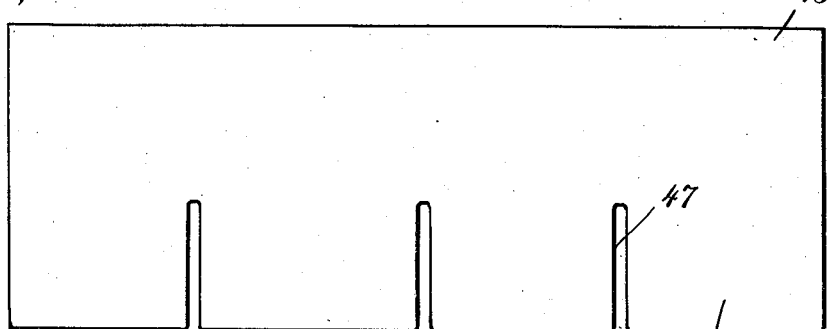
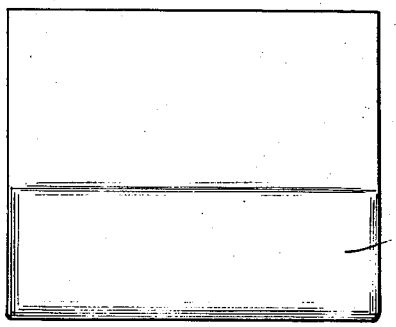
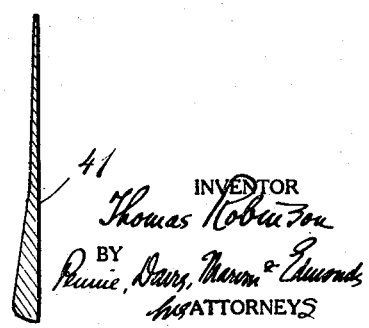
INVENTOR
Thomas Robinson
BY
Rennie, Davis, Marvin & Edmonds
ATTORNEYS Aug. 9, 1927.
T. ROBINSON
1,638,746
ROOFING ELEMENT
Filed June 26, 1924 4 Sheets-Sheet 3
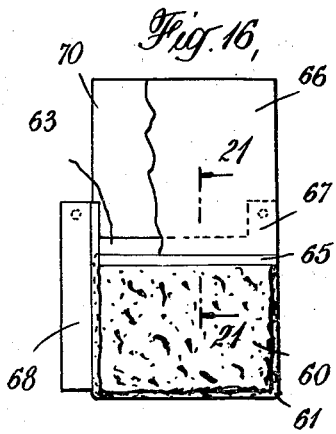
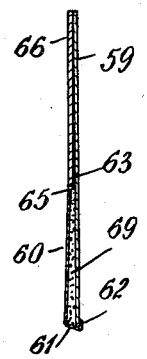
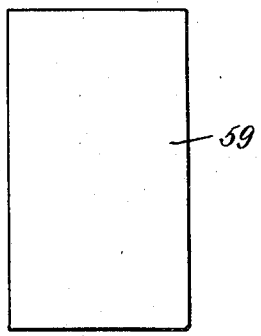
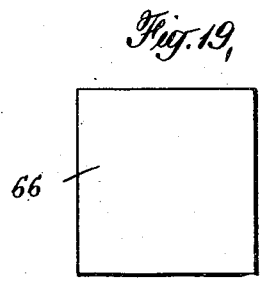
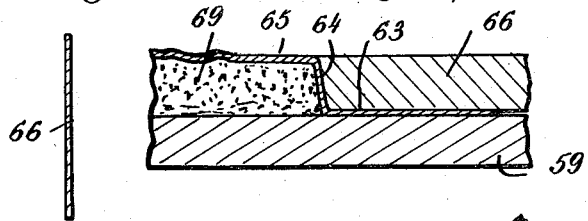
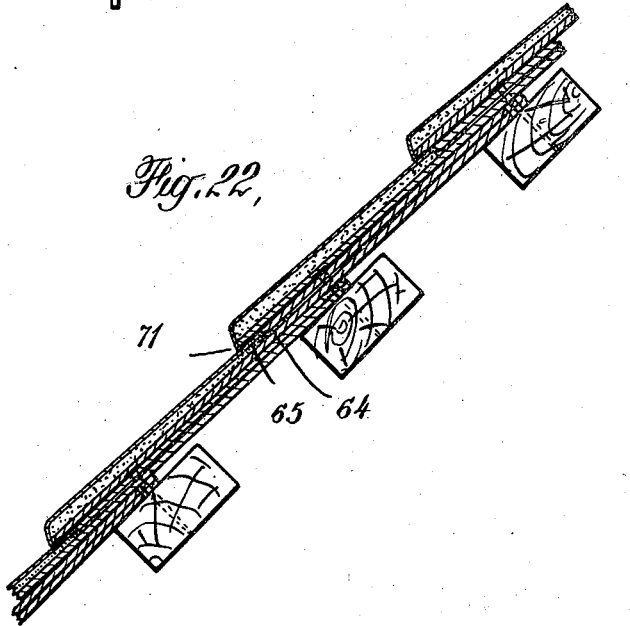

Aug. 9, 1927.
T. ROBINSON
1,638,746
ROOFING ELEMENT
Filed June 26, 1924 4 Sheets-Sheet 4
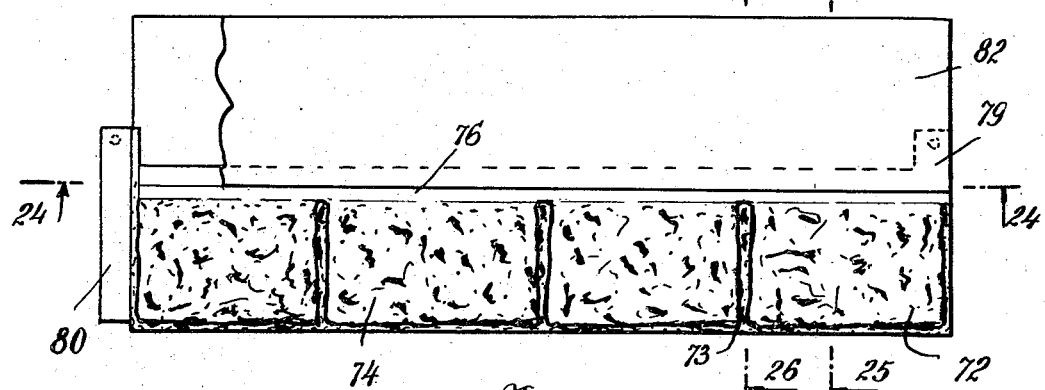
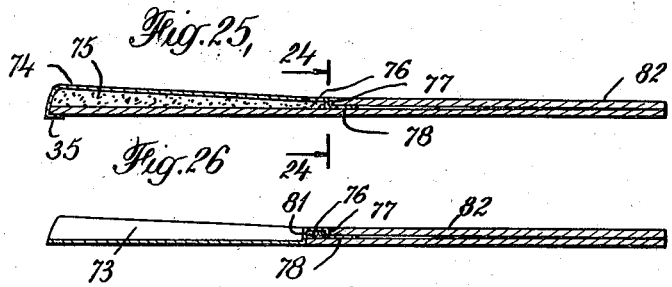
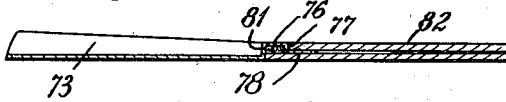
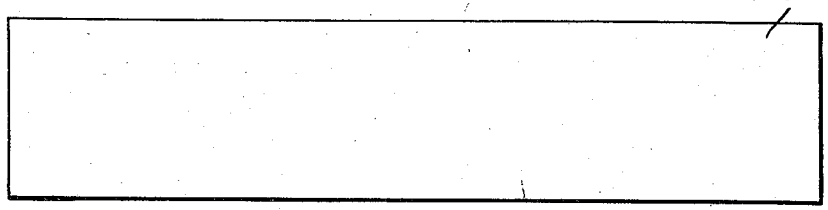
INVENTOR
Thomas Robinson
BY
Pennie, Davis, Marvin & Edmonds
HIS ATTORNEYS Patented Aug. 9, 1927.

1,638,746

UNITED STATES PATENT OFFICE.

THOMAS ROBINSON, OF NEW YORK, N. Y., ASSIGNOR TO ANACONDA SALES COMPANY, OF NEW YORK, N. Y., A CORPORATION OF DELAWARE.

ROOFING ELEMENT.

Application filed June 26, 1924. Serial No. 722,452.

The present invention relates to roofing elements and more specifically to elements which are of a composite type and consist of a base made of various water-proof and weather-resistant materials, to one surface of which is affixed a continuous sheathing layer or shell of a non-corrodible metal, such as copper.

Composition roofing materials of many kinds are now in common use and are frequently made of a base such as that commonly known as roofing felt, which consists usually of rags, paper, burlap, and other similar materials impregnated with water-resistant compounds, of which bitumen or asphalt is an example. Other composition roofings consist of ground cork, asbestos or magnesia mixtures, suitably bound together with cements or binding materials of different kinds. These roofing products are made in the form of single elements similar to shingles, tiles, and the like, and in a wide variety of shapes and sizes, and are also made in the form of so-called roll roofing. The single elements are usually applied to the roof in overlapping courses, as is the common practice with ordinary wood or slate shingles, while the roll roofing is laid in strips placed side by side and extending either lengthwise or crosswise of the roof surface. These roofing products frequently have surfaces which are suitably colored and it is common practice to provide the roofing with a surface layer of granular material embedded in or otherwise secured to the surface.

These composition roofings are comparatively much less expensive than wood or slate shingles and they may be made in numerous forms which render their application to the roof convenient. Among these forms are single and multiple shingle elements, Spanish and mission tiles, boards, strips, and the like. These materials, however, in spite of their low cost, possess numerous inherent disadvantages which reduce their effectiveness in service and in many instances make their use highly objectionable.

Composition roofings are ordinarily quite flexible and the impregnating materials which are used frequently include oils of a somewhat volatile character so that upon exposure to the sun the base material deteriorates by reason of the volatilization of these oils, and the edges of the elements, especially when the latter are laid in courses like shingles, have a tendency to warp and curl. The loss of the volatile oils of the base causes the latter to disintegrate and this is particularly true when the roofing is used in a severe climate. The curling and warping of the elements is highly objectionable, not only because gaps or holes permitting wind and rain to enter, may be opened up in the roof, but the warping and curling may be so extreme as to give the roof an unsightly appearance. Furthermore, the materials are usually made in a limited number of colors and these roofings nearly always have an artificial appearance which is wholly different from the appearance of a wood shingle roof or one made from the usual slates or tiles. Also in the case of single elements, these elements are of a uniform size and shape and consequently have a different appearance from wood or slate shingles.

Metal roofing elements of various kinds of metal possess numerous advantages over the composition products, as, for instance, in withstanding the weather better and also in being more resistant to fire, but these all-metal elements are much more expensive not only in the original cost but also in the cost of installation, since special care must be taken to make the joints tight. It is difficult at best to secure a weather-proof metal-to-metal joint and if soldering is resorted to this is a laborious and expensive operation. Also these all-metal elements transmit heat with great rapidity, and additional layers of sheathing must be interposed between them and the roofing boards in order to make a satisfactory roofing.

The present invention is intended to provide a material which possesses the advantages of both types of roofing elements above referred to, while avoiding their disadvantages, and the desired result is obtained in accordance with the present invention by making the element of a base of various composition products and then affixing to that portion of the base which is normally exposed when the element is laid on the roof, a shell of metal which is held in place thereon by suitable means, as, for instance, by the interposition of a plastic filling material of an adhesive character. Such an element may be made in any of the various forms now in common use, but since it offers special advantages when used in those forms which are laid in overlapping relation on the roof, the adaptation of the invention in the form of single or multiple shingles will be presently described with the understanding, however, that the principles of the invention are not limited in application to any such form, which is described merely for convenience as representing one typical adaptation.

In the single unit shingle the roofing element constructed in accordance with the present invention consists of a base made of a non-metallic material resistant to water, in the form of a plate of the usual shingle dimensions. Since in roofing elements laid in courses only one end or margin of the element is normally exposed to the weather, this portion only need be protected, and accordingly there is secured to the base over its lower end, a shell of thin metal which has a portion at its upper end lying flat on the surface of the base. Forward of this flat portion the central part of the shell is raised above the surface of the base and the space so provided is filled with a suitable filler which supports the metal and serves to bind it to the base. At the lateral and end edges of the base the metal turns downwardly over the edges of the base and, if desired, may be turned in under the base so as to assist in binding the base and metal together. Extending from one side of the base, and lying substantially in the plane of its under surface, is a tab of metal which is to be overlapped by the next adjacent element when the elements are laid in courses. This tab, if desired, may be made as an integral extension from the shell. Also, if desired, at one end the flat portion of the shell which lies in contact with the surface of the base, may have a rearwardly extending tab through which a nail may be driven. The shell is of such dimensions that it covers the normally exposed margin of the base and extends beyond the margin a distance sufficient for nailing. Also, the lateral tab extends a similar distance to the rear along the edge of the base, so that when it is overlapped by the next adjacent element, a nail driven through that element will pass through the tab so as to hold both elements in place on the roof.

In a slightly modified form of construction the base and shell are of the form which is described, but the rear surface of the base which is not covered by the shell is further protected by a cover layer of material resistant to water, this cover layer extending from the rear edge of the base and forwardly so as to overlie that portion of the shell which lies flat upon the surface of the base. This cover layer may be of a waterproofing material of a plastic character, such as asphalt or asphalt and a suitable filler, or it may be made of a plate of material similar to that of which the base is made. In either event, it serves to strengthen that portion of the base which is not covered by metal, and also by overlying the rear edge of the metal it prevents any water from entering between the metal and base, which might eventually result in separation.

In roofing element of any of these types, the metal shell is preferably preformed in any convenient manner. For instance, the metal may be deposited electrolytically on the surface of a cathode having a shape the same as that which the shell is to have when assembled with the base. If desired, the metal may be deposited on a drum cathode, stripped continuously therefrom and then stamped or otherwise given the desired configuration. Various other methods may be used for the production of the shells, but it is preferable to employ metal which is electrolytically deposited for the purpose. The shells vary somewhat in thickness, but ordinarily will not be thicker than tenthousandths of an inch. Consequently electrolytic methods for the production of the shells are much less expensive than rolling processes for producing thin sheets of metal which are later formed in the desired shapes.

In another type of element the base is not of uniform thickness but at its forward end, which is to lie at the end of the element which is to be exposed, the base is of gradually increasing thickness, having a cross-sectional contour which corresponds in a general way to the concavity of the shell. This type of element requires less filling material than the one in which the base is of uniform thickness, but in either case the shell is firmly supported from beneath and cannot be crushed when in use. In one instance the support is provided by the filling of the hardened plastic material, while in the other it is provided in part by the adhesive and in part by the shape of the base itself. In a slightly modified form of element the metal extends rearwardly beneath the under surface of the base so that the shell is in the form of a bag into which one end of the base is inserted, together with such a quantity of filler as may be required.

Regardless of the form of the element which is produced, it will be seen that the base is provided, over that surface which is normally exposed to the weather, with a protective layer of metal so that the life of the base is considerably lengthened. Furthermore, the application of the metal shell increases the rigidity of the base and strengthens it over that area where such an effect is desirable. The metal is applied economically because a thin film may be employed, as the metal is not used wholly for its mechanical strength, being supported from beneath either by means of the base itself or by the filling material. The porosity of the metal is not highly detrimental because the filling material selected will be of a water-resistant character such that any holes in the shell will be stopped by the filler and no leakage can result. Since each element has a portion which underlies the element next beside it and thus serves to close the gap normally existing between a pair of elements in a course on the roof, it will be seen that the entire surface of the roof is covered by metal and this result is brought about even though the elements may be of irregular size and shape and the spaces between them not uniform. At the same time the desired result is brought about without completely covering the base with metal. The surface of the element which is exposed to the weather and is thus covered by the metal shell, may be given, any desired surface effect during the processes in which the shell is produced and thus it is possible to give the metal a roughened, beaten effect similar to that of a weathered shingle or of a heavy tile, and the effect may be heightened by coloring the metal by any of the well-known processes for this purpose. It is preferable to give the surface of the metal shell a beaten appearance, such that it has depressions and crests, this irregular contour providing a better bond between the shell and the base because of the mechanical interlock between these irregularities and the filler. Also, forming the shell with these numerous irregularities obviates expansion difficulties because the different parts of the base will expand in different directions, thus counteracting each other. This is a particularly desirable feature because the rates of expansion of the metal and the base are quite different and if the shell were quite flat and laid directly on the surface of the base, the total expansion effect in the metal might be sufficient to cause the shell and base to become loosened.

Shingles of this type offer other peculiar advantages in that the contact between separate shingles is not metal-to-metal, but is metal-to-composition, since the metal shell covers only a single surface of the base. The nonmetallic material is comparatively soft and when the elements are laid on the roof the rear face of one element lying over a portion of the metal on the element in the course next beneath tends to produce a satisfactory water-tight joint. Also, the manner in which the shell is formed so as to have downwardly and outwardly extending edge portions, greatly strengthens the element along its extreme exposed edge and the consequence is that the element is most rigid in those places where rigidity is most required. This rigidity depends to a large extent on the material of which the base is made and the element may be made stiff or flexible within certain limits by the selection of appropriate base and filler materials. Since the element has its exposed surface covered by metal in a continuous layer, a roof covered with this material is wholly fire-resistant and is greatly superior to roofs made of composition materials as now used.

In the annexed drawings there are shown various views of the new type of roofing and in these drawings, Fig. 1 is a face view of a single shingle element, Fig. 2 is a cross-sectional view taken longitudinally of the same, Fig. 3 is a face view of the base member, Fig. 4 is a view showing a portion of a roof made of these elements, Fig. 5 is an enlarged section of a portion of the roof taken longitudinally of the shingle, Fig. 6 is an enlarged cross-sectional view of a portion of such a shingle, Fig. 7 is a cross-sectional view of a modified type of shell, Fig. 8 is a view in longitudinal cross-section of an element in which the shell shown in Fig. 7 is employed, Fig. 9 is a face view of a multiple unit shingle, Fig. 10 is a cross-sectional view of the same taken on the line 10—10 of Fig. 9, Fig. 11 is a longitudinal cross-section taken on the line 11—11 of Fig. 9, Fig. 12 is another cross-sectional view taken on the line 12—12 of Fig. 9, Fig. 13 is a face view of a base member such as is used in the shingle shown in Fig. 9, Fig. 14 is a plan view of a modified type of base as used in single element shingles, and Fig. 15 is a longitudinal section of this modified type of base, Fig. 16 is a face view of a single shingle element of modified form, Fig. 17 is a longitudinal cross-section of the same, Fig. 18 is a face view of the base member, Fig. 19 is a face view of the cover plate, Fig. 20 is a sectional view of the cover plate, Fig. 21 is an enlarged cross-sectional detail taken on the line 21—21 of Fig. 16, Fig. 22 is a view similar to Fig. 5, showing a plurality of elements constructed as illustrated in Fig. 16, applied to a roof, Fig. 23 is a face view of an element of the multiple unit type provided with a cover plate, Fig. 24 is a cross-sectional view of the same taken on the line 24—24 of Fig. 23, Figs. 25 and 26 are cross-sectional views taken respectively on the lines 25—25 and 26—26, of Fig. 23, and Fig. 27 is a face view of a cover plate as used in the element illustrated in Fig. 23.

Referring now to these drawings, the single shingle element shown in Fig. 1 consists of a base member 30, which is in the form of a plate substantially the shape and size of a wood or slate shingle, such as is now in common use. This plate, as shown in Fig. 3, is rectangular and may be of uniform thickness throughout. This base may be made of many well-known materials of a nonmetallic character and resistant to water. For instance, the base may be made of so-called asphalt roofing felt, or various other products impregnated with water-resistant compositions of a bituminous or asphaltic character. The base may also be made of fibrous products, such as asbestos impregnated with suitable water-resistant compounds, or of granulated cork, which may be held together with a binder such as asphaltic compositions or those which include magnesite. Granulated cork may also be used without a binder, the particles being held together under the action of heat and pressure by means of the essential oils and resins in the cork. Mineral wool, infusorial earth, and sawdust, impregnated with asphalt, may also be used, and a mixture of Portland cement and asbestos molded to the appropriate shape will serve the purpose. Instead of making the base of a molded material, it is possible to make these bases of thin machine riven pieces of slate which is much thinner than the average slate used for roofing purposes but is perfectly satisfactory for general use when strengthened by the application of the metal shell. The base is best made of a material which is nonmetallic, heat-resistant, water-resistant, and of an inexpensive character, and while the examples above given are compounds which are satisfactory for the purpose, it will also be understood that many others may also be used. Since, as will presently be shown, the base of these elements is not exposed to the weather, the base does not have to be fire-resistant necessarily, although it is preferably so. For this reason the base may be made of ordinary wood, similar to the usual shingle, either impregnated or not, as desired. This latter form of base, however, is not so desirable as several of the others, and it may be stated generally that the material which affords probably the greatest advantages is a roofing felt which consists of fibrous materials such as paper, rags, burlap, and the like, impregnated with a water-resistant compound of the bituminous type and molded to proper shape. This material, and numerous others of those previously mentioned, may be referred to generally as a hardened plastic composition which is resistant to water.

Affixed to the surface of the base so as to cover the forward end of the latter, which is the end exposed to the weather when these bases are laid in the usual way in overlapping courses on the roof, is a metal shell 31, which may be made of any desired metal which does not corrode easily and which has an appearance which would make it satisfactory for roofing purposes. Copper is probably the most desirable material for this use, because of its pleasing appearance, its resistance to corrosion, and the ease with which it may be handled electrolytically, although zinc and other similar materials may also be used. This metallic shell is of comparatively slight thickness and is formed with a concave portion 32 which forms substantially the main body of the shell. This concave portion is preferably of increasing depth toward the forward edge of the shell and at the rear the shell terminates in a flat extension or strip 33 which runs the width of the shell and which is to lie in intimate contact with the face of the base. This portion may thus be considered to lie substantially in the plane of the surface of the base, although it is not essential that it should be forced beneath the surface so as to lie flush with the latter. The bottom of the concavity of the major portion of the shell is less in area than that portion of the base which is to be covered and it terminates in splayed edge portions 34 which extend outwardly and downwardly so as to cover the edges of the bases. These edges may terminate flush with the rear surface of the base, as shown in Fig. 2, or may have a projecting portion 35 shown best in Fig. 25, which is bent over the rear face of the base so as to hold the forward edge of the shell more securely in place. Projecting beyond one edge of the base is a metallic tab 36 which is preferably continuous with the shell. This tab is cut back at its front edge, as at 37, so as to lie somewhat to the rear of the forward edge of the element and at its rear end it terminates at 38 a slight distance to the rear of the rear edge of the flat portion 33. By cutting back the front end of the tab 36 this tab may be used as a gauge for laying the elements in place, since the end of the tab lies to the rear of the front edge of the concave portion of the shell a sufficient distance so that when the forward edge of the tab on the upper course lies even with the forward edge of the flat extension 33 of the element next beneath, the desired headlap is obtained. This greatly simplifies the laying operation, and insures that the elements will be laid so as to cover the maximum area. This tab lies below the plane of the bottom of the concave portion 32 and also below the plane of the flat portion 33 of the shell. Preferably it will lie substantially flush with the rear face of the base. Also, along the edge opposite to that on which the tab 36 is formed, there is a rearwardly projecting tab 39 overlying the surface of the shingle and forming an extension from the flat portion 33, which as will presently be described, provides a surface through which a nail may be driven to secure the element in place on the roof. Instead of employing the rearwardly projecting tab 39, it is possible to form the flat portion 33 so that its rear edge extends to the point where the tab 39 would normally terminate. This will involve the use of a somewhat larger quantity of metal, but the additional cost is negligible. In any event, the shell is to cover the normally exposed margin of the base when the elements are laid in courses, and the flat portion 33 should extend rearwardly beyond this margin a distance sufficient for nailing. The bottom of the concave portion of the shell, which is the area 32, is preferably given an irregular surface simulating the appearance of hand-beaten copper, as is indicated generally at 40, in Fig. 6, and this treatment of the surface of the shell gives the roof made of the elements a pleasing appearance. Although the shell is made of very thin metal it is greatly strengthened at the edges by reason of the inclined edge portions 34, since the inclination of these edges resists any tendency of the base to warp or curl.

With the main portion of the shell of a beaten appearance, it is desirable that the flat portion 33 should be substantially smooth, and because of the increased depth of the concavity the element has a considerable thickness at its forward end which corresponds in a general way to the thick butt of a shingle, or to the butt end of a tile, but since the shell is the only portion of the element which is exposed when the latter is in place, this shell may be given any desired shape or form, according to the surface appearance of the roof which it is desired to obtain. The formation of the shell, consequently, will depend to a large extent on the type of element which the new roofing is intended to simulate and if the roof is to be given the appearance of a tile roof the shell will have a somewhat greater depth at its exposed end so that the element is considerably thicker. Also, the exposed edges of the element will be somewhat irregular, as illustrated in Fig. 1, to correspond in a general way to the irregular edge of a tile. If the elements are to be made in the shape of Spanish or mission tiles, the base will, of course, have the appropriate shape for that purpose and the metal shell will have a similar shape, depending on the shape of the base.

Since the metal has a concave portion in which the forward edge of the base is to fit, provision must be made for securing the base in place within the shell, and it is desirable that the portions of the base which are spaced from the shell should be mechanically supported so as to prevent the metal from being collapsed or punctured if anyone were to walk on the roof. The most convenient means of supplying this support, and also of providing the desired adhesion between the base and metal, is to make use of a plastic filling material of an adhesive character. Among the filling materials which are suitable for the purpose are asphalt or bitumen and their emulsions used alone, or in combination with granulated or fibrous materials. For instance, it is possible to produce a filling material of a generally satisfactory character by the use of refuse felt, resulting from the manufacture of the bases, this material being cut up fine and mixed with asphaltic material. Also, it is possible to make use of ground cork, infusorial earth, sawdust, ground coke, ground slag, mineral wool, and asbestos, mixed with suitable water-proof binders. It is also possible to make use of Portland cement, preferably mixed with asbestos fibres. The water-proof binders may be of many different kinds, of which the asphaltic products are but one example. Among others are the resins which are produced as by-products from cork distillation, and numerous other materials which will become hard and take a permanent set and which are water-resistant and useful. It is desirable that the filling material should be of an adhesive character so that when it has set the base and shell will be firmly bound together. In applying this material the shells will be turned with their concave faces uppermost, a quantity of the filler placed in the concavity, and a thin film applied to the rear face of the flat portion 33 of the shell. The bases are then inserted in place and the shell and base subjected to pressure which causes the parts to unite and form a substantially rigid unit. The quantity of filling material which is used will, of course, depend on the concavity of the shell. In Fig. 2 the base employed is of substantially uniform thickness throughout, but if desired, it is possible to make use of a base such as is illustrated in Figs. 14 and 15, where the forward end of the base, as at 41, is of increased thickness and conforms in a general way to the shape of the shell. With this type of base a less quantity of the filler is used, although a thin layer is required in order to cause the shell and base to be held together properly.

Elements of the type just described are employed in the customary manner in covering a roof, and are laid side by side in courses with the elements in one course overlying the edges of those in the course next beneath. This is shown in Fig. 4. The rafters of the roof framework are covered with battens 42 which are placed side by side a short distance apart. The elements are then laid in courses over the battens, the elements in each course being placed so that the smaller tab 39 lies directly over a batten, and then a nail 43 is driven through this tab. The position of the nail is indicated at 43' in Fig. 1. Each of the elements in a course overlies the lateral tab 36 of the element next beside it, and consequently the nail driven through the tab 43 also passes through the tab 36 of the next adjacent element, as at 44. The nail passes through the shell and base of one element, the tab of an adjacent element, and through the rear end of the base of an element of the next lower course. Consequently each element is held in place by three nails, one of which passes through the shell and the base, another through the tab, these nails lying forward of the rear edge of the shell, and a third which has been driven through the element of the next higher course and which passes through the base near the rear edge thereof. By this arrangement the elements may be given the desired lateral spacing so as to have the appearance of ordinary shingles or tiles, but the space between adjacent elements is covered by the tab 36 on one of these elements. Consequently, the entire area of the roof is covered by a layer of metal. When the next course of elements is laid the forward edge of this course, as at 45, projects a slight distance beyond the flat portions 33 of the elements of the course next beneath, as may be determined by using the tab 36 as a gauge, thus concealing this flat portion and also providing a tight joint between the two courses, by reason of the contact of the rear face of the element in one course with the flat portion of the element in the course below. This contact consequently is between metal and base, and since the base is ordinarily somewhat soft the base and metal will readily conform to each other so as to make a good joint. By reason of the overlap of the upper course at this point the nail passing through the element of the lower course lies a considerable distance to the rear of the front edge of the upper element, as shown in Fig. 5, and leakage is thus avoided. Also, there is no possibility of corrosion attacking the shell from beneath because the entire lower surface of the shell is covered with the filling material and then beneath that is the layer of the base. It will also be seen that with this arrangement there is at least a double thickness of elements throughout the roof and in some parts this thickness is trebled. Each element has a length greater than twice the length of its exposed margin so that the forward end of each element not only covers portions of the rear ends of elements in the course next beneath, but also laps the rear end of the element of the second lower course. This last lapping is frequently referred to as "head-lap." There is also no possibility of leakage occurring around the nail, not only on account of the extent to which the nail lies to the rear of the forward edge of the upper element, but also because this nail passes through the tab and then through a portion of the base which will normally enclose the nail snugly.

It will be observed that in laying the new elements in courses, each element overlies portions of the element in the second lower course. The shell consequently need only cover the normally exposed margin of the base and extend beyond this margin a distance sufficient for nailing. To the rear of the exposed portion of the shell the latter is covered by the forward edge of the element of the course next above, and when the elements are laid side by side with each element lapping the tab of an adjacent element, a nail may be driven through the element so as to pass through the shell, its base, the tab of an adjacent element, and the base of an element in the next lower course. This nail is concealed by the forward end of the element in the course above, and by passing through the metal, the nail securely holds the element in place, and, passing through the soft base, is surrounded by the base material in such a way that leakage cannot result. At the joints; that is, the spaces between adjacent elements in a course, the roof is well protected because of a succession of layers of material which include the tab of one element and the base of an element in the course next beneath. Then, at the forward end, a part of the shell of this element of the course beneath and also a part of the base of the element in the second lower course, underlies the joint. This arrangement of superposed layers of metal and base material is such that no possible leakage can take place, and all portions of the base material which would normally be exposed are now covered by metal so that complete protection against fire is provided. Also, by the provision of tabs, the elements in each course may be laid without reference to the joints in the elements of the next lower course, and this makes the laying of the elements a simple operation because extreme care is not necessary.

With the elements laid in this manner the exposed surfaces are entirely covered by metal, and the edges are also protected by means of the edge portions 34 of the shell. These edge portions add greatly to the rigidity of the base along the edges and assist materially in preventing warping or curling. This, however, is not so likely to occur with elements of the present type because the metal shell protects the base from deterioration, which is ordinarily one of the causes of warping. The beaten surface given the concave portion of the base not only gives the roof an attractive appearance, but it causes the plastic filler to adhere more firmly by reason of what amounts to a mechanical interlock between the filler and the irregularities. Furthermore, these numerous crests and depressions formed in the shell serve the desirable feature of counteracting expansion effects. The shell of metal has a considerably greater rate of expansion than the base and the filling material, and the repeated expansion and contraction in the shell due to temperature changes might produce a loosening of the shell from the base if the shell were to have a plain surface, but with the beaten surface the irregularities formed in it cause the expansion to take place in different directions so that the expansion of one portion of the base will counteract that of another portion. Thus the total expansion effect is practically negligible. The shell, therefore, has little tendency to be loosened from the base, and the element is capable of use for long periods of time without substantial deterioration.

These elements may be made in many different sizes and shapes, and the appearance of the roof covered by them is greatly enhanced when the elements are not of a uniform size. The present element is capable of use in different sizes, while at the same time providing a continuous metallic sheathing over the roof. Since each element overlies the tab on the one next beside it, the entire area of the roof in a single course is protected wholly by the metal in the elements of that course, without regard to those of underlying courses. Consequently, the laying of these courses may be considered to be independent operations and it is unnecessary to apply metal to any portion of the bases of the elements to the rear of that area which is normally exposed. The cost of the elements is, therefore, greatly reduced, and they may be made in various irregular sizes so as to have an irregular bond, thus avoiding a monotonous regularity in the appearance of the roof. Also, by reason of the manner in which the elements are held in place by a single nail, the elements in a course may be laid either from left to right or from right to left. In laying from right to left the element at the right-hand end of the course is laid at the edge of the roof. A nail is driven through the tab in this element. The next element is nailed in place at the left-hand side to overlie the tab 36, then a nail is driven through its tab 39. This method of laying is continued throughout the length of the course. When the next course above is to be placed in position the left-hand element is laid in place but before the nail is driven through, the next element to the right is placed so that its tab underlies the first element, the nail is driven through the first element, and through the lateral tab. Then the second element is slightly lifted so that the lateral tab on the third element may lie beneath it. The nail is then driven through the second element and the process continued throughout the course. Consequently, by reason of the saving in nails and the convenience in laying, the cost of installation of this type of material is quite low.

Because of the fact that the metal shell simply provides a protective sheathing and need not be of great mechanical strength, only a small quantity of metal is used in each element and this metal may be made very thin by reason of its being supported from beneath. While it is desirable that the metal should be impervious, this is not essential because the adhesive material placed beneath it is of a water-resistant character. It sometimes happens that in making shells of this type electrolytically, portions of the shell are injured or torn so as to result in pin holes. A base of metal having these holes would, of course, be utterly useless when used as an all metal roofing element, but these holes are not detrimental in the present instance because the bases and filling materials which are used with the shells are of a water-resistant character. These bases are a comparatively cheap product and since only a small quantity of metal is used which is confined wholly to those portions of the base which are exposed to the weather, it follows that an element of this kind is but little more expensive than a plain composition roofing, and is much less expensive than an all metal product. Also, these elements are easily laid at a low cost and the elements are so designed that a high degree of skill is not required on the part of the workman in order to make a tight roof. With the elements laid in place in courses the roof has an attractive appearance which may be enhanced by suitably treating the metal to give it color effects. Such a roof is not only resistant to the weather, but is also highly fire-resistant and will last for an indefinite period because the metal used is of a non-corrodible character.

In Figs. 9 to 13, inclusive, there is shown a slightly modified form of element which differs from that previously described in that each element has the dimensions of a plurality of shingles laid side by side. This multiple shingle element may be made to correspond in area covered to any desired number of single shingles, but ordinarily it is made in the four-shingle size, as shown in Fig. 9. In this case the base 46 has a width corresponding to the length of an ordinary shingle, and a length which is substantially equal to the width of four shingles laid side by side with the usual spaces between them. This base has cutouts 47 formed in its front edge corresponding in width to the space between shingles as usually laid, and these cutout portions may be in any desired spaced relation, but are preferably so formed that the distance between them is not uniform. The metal shell 48 which is used with this type of shingle has the transverse extension 49 along its rear edge, as before, and also has the tab 50 for nailing purposes. More than one of these tabs may be used if desired, though one is ordinarily sufficient. If desired, of course, the transverse extension may be continued rearwardly to the point at which the tab 50 ordinarily terminates. The shell thus covers the normally exposed margin of the base, plus a distance sufficient for nailing. The main body of the shell is made concave, as before, having downwardly and outwardly extending edges 51 and there are formed in the metal shell, at locations which correspond to those of the cutouts 47, depressions 52 which divide the main concavity of the shell into sections, each of which receives a portion of the base, as indicated at 53, with the depressed portions entering the cutouts 47. These depressions, if desired and as shown in Fig. 10, may be of a depth such that the lower surfaces will lie substantially flush with the rear face of the base, although this is not requisite. The depressions, however, are formed as an integral part of the metal of the shell. Consequently, at the rear ends, as at 54, the cutouts are closed by the metal. The depressed portions which enter the cutouts extend rearwardly to the flat transverse portion of the shell, and when the element of the next course is laid thereover, the rear end of the depression is somewhat to the rear of the front edge of that overlying element and is thus concealed from view. This type of element, as before, is provided with the lateral tab 55, which is preferably made continuous with the main body of the shell and lies substantially flush with the rear surface of the element. The conformation of the shell is illustrated more clearly in Fig. 11, in which the increasing depth of the concavity is shown at 56 and the downwardly and outwardly projecting edge at 57. In Fig. 12, which is a view taken through one of the depressions, the rear end of the depression is shown at 54, this view illustrating how the rear edge of the spacing between the sections of the shell is closed.

These elements are, as before, laid side by side in the usual manner in overlapping courses, preferably with the cutouts in one course breaking joint with the elements in the course next above, or below. A roof covered by these elements consequently has an appearance which is closely similar to that of a roof covered with the single unit elements, but the multiple shingle element is considerably less expensive to lay because fewer nails are required since each nailing operation secures an element in position which covers a space equivalent to that covered by four single shingles. The multiple shingle element is, in other respects, closely similar to the single shingle type, the concavity of the shell being filled with a plastic material, as before, and the base may be either of uniform thickness throughout, or may have a form similar to that illustrated in Figs. 14 and 15.

In Figs. 7 and 8 there is shown a slightly modified form of element which may be either of the single or multiple shingle type. In this element the metal shell has a rear face plate 58, extending to the rear a considerable distance. This rear face plate lies in contact with the lower surface of the base so that the metal shell practically forms a bag into which the end of the base is inserted. This provides a somewhat more rigid element, with the base better protected from the weather, and is desirable for use in unusually severe climates.

In Figs. 16 to 22, inclusive, there is shown another modified form of element of the single unit type, which differs from that illustrated in Fig. 1, for instance, by reason of its being provided with a cover plate which covers the surface of the base to the rear of the shell. As before, the base is of rectangular form, as illustrated at 59, and the shell employed has a concave portion 60 terminating in the inclined edge 61 which may have a portion extending beyond the rear face of the base so as to be turned in under the same, as shown at 62. The shell also has a flat extension 63 lying in contact with the surface of the base and this extension includes a portion 64 which makes an abrupt change of direction so as to form a flange. The transverse extension has a portion 65 which extends a slight distance forward of the shoulder formed by this flange, and the cover plate 66 which is to be affixed to the rear face of the base covers the portion 63 of the extension and abuts the flange 64. The portion 63 of the extension has the usual nailing tab 67 and the metallic tab 68 extending along one side of the base is also provided. This tab, preferably forms a continuous portion of the shell. The cover plate illustrated in Figs. 19 and 20 covers the rear face of the base behind the shell and its upper surface lies practically flush with the rear edge of the shell, as at 65. Instead of using a cover plate which is preformed and made of a composition similar in a general way to that used in the base, it is also possible to apply a layer of the filling material over the rear surface of the base, this layer being preferably of a substantial thickness so that at its front edge which overlies a portion of the flat extension from the shell, the layer is of substantially the same thickness as the shoulder formed at this point. In making these elements the plastic filling material 69 is inserted in the shell, the base is then placed in the concave portion of the shell, a coating of the adhesive material is applied to the upper surface of the base, as at 70, and then the cover plate 66 is put in position and the several parts subjected to pressure to cause them to unite into a single unit. When the layer of plastic material is used instead of the cover plate the base and shell are assembled in the usual way, with the filling material interposed and thereafter the layer of plastic material which serves for the cover plate, is applied and allowed to set. This construction is in some ways desirable over that previously illustrated, since the rear extension of the shell is concealed by the covering layer and there is no possibility of water entering beneath the extension 63 and coming into contact with the plastic filling. Also, in the course of manufacture, it is possible in making this type of element, to make a unit having a more finished appearance since the rear edge of the extension of the shell is concealed. This type of element may have a somewhat greater thickness at the rear end than that previously described, which is made without the cover plate, and this makes a more rigid construction. It will be understood that in the production of an element provided with a cover layer, it is not essential, though perhaps desirable, to make the shell with the off-set flange 64. If the flange is omitted, the cover layer is tapered at its forward end so as to lie smoothly against the upper surface of the extension 63, and in this way the upper surface of the element has no jog at this point. Also, in the manufacture of elements with the cover plate, the base may be considerably thinner than in the case of elements in which no cover plate is used. The desired strength and rigidity at the forward end of the elements is provided by the shell, and the plastic filling material, and at the rear the cover plate and thin base, united together by pressure, give a layer of sufficient thickness and stiffness.

The elements of the type illustrated in Fig. 16 are laid in the usual manner, as shown in Fig. 22, and the forward edge of each course at 71 overlies a portion of the shell 65 which is ahead of the flange 64. This makes a tight joint and there is no possibility of water seeping down between the shell and the base itself.

In Figs. 23 to 27, inclusive, there is shown a multiple shingle element of the type illustrated in Fig. 16. This shingle has the metal shell 72, having the depressed areas 73 which enter the cutouts of the base, and the sections of the concavity, such as 74, between these depressions are filled with a plastic material 75. The rear edge of the shell terminates in a flat portion 76 which in turn has the offset shoulder 77 and the flat extension 78 which lies in contact with the surface of the base. This extension has the tab 79 for nailing purposes and the element is provided with the lateral tab 80 to close the space between adjacent elements when they are laid in the usual relation. The shell is formed so that the depressed areas 81 terminate somewhat forward of the flange 77 so that the depressed area will not intersect the flat portion 78 of the shell. If, in the case of the single element shingle, a cover plate or plastic layer 82 is provided which covers that portion of the base not covered by the shell, the front edge of this cover plate abuts the flange 77. In general the construction is similar to that employed in connection with the single element shown in Fig. 16.

In the production of elements of the type described, the bases are prepared in the desired shape and size by methods which depend on the type of material which is to be used. When these bases are made of impregnated felt, they are ordinarily produced in the form of sheets which are then cut to the desired size. The shells are made by numerous processes, previously mentioned, as, for instance, by stamping operations, and preferably of electrolytic copper. The shells are preformed in the desired configuration and they may be affixed to the bases in any desired manner. For example, the shells may be placed with their concavities uppermost, then a quantity of the filling material placed in the concavities, the end of the base inserted, and the base and shell united by pressure. Thereafter, the edges of the shells may be bent in over the edges of the base, if such a type of element is being made. Various other methods for producing the elements may also be employed, and the construction of elements other than those in the form of shingles will be substantially the same as the shingle elements. In each case, it is desirable to produce a preformed metal shell which will cover only the exposed margin of the element and extend beyond that margin only a distance sufficient for nailing. In this way the amount of metal required is kept within low limits, and the cost of the new product is quite small. In any of these roofing products, it will be observed that the base alone is of insufficient rigidity and is ordinarily of a metal which is not highly durable when in use for building purposes. The base is water-proof, but in any of these impregnated bases deterioration sets in so that the bases are not to be compared to all-metal roofing elements. The metal which is employed to cover the normally exposed margin of the base is extremely thin and alone would not have either sufficient mechanical strength or rigidity for structural purposes. With the shell affixed to the base in the manner described, and with a body of hardened plastic adhesive material interposed between the base and the metal, the element has all the stiffness that is required, and the metal is supported throughout its surface so that it cannot readily be punctured or damaged by anyone walking on it. Thus the combination of the metal, the plastic material, and the base together, produces a roofing element which has all the desirable characteristics of an all-metal roofing, although the cost of the product is much less than all-metal elements. Also, the new roofing is entirely fire-proof, and extremely durable, since there are no portions of the base which are exposed to the weather.

I claim:

1. A thick-butt metal-clad roofing element comprising the combination of a base of non-metallic material resistant to water, a shell of thin metal disposed at one end of the base, one end of this shell extending over the end edge of the base while the other end of the shell terminates in a flat portion extending across the base between the ends thereof and lying flat against the upper face of the base, the intermediate portion of the shell between its ends being raised above the surface of the base, and filling material between the raised portion of the shell and the base supporting this raised portion and securing the shell to the base.

2. A thick-butt metal-clad roofing element comprising the combination of a base of non-metallic material resistant to water, a thin metallic shell overlying one end of the base and forming the surface of the element normally exposed to the weather, this shell having a flat portion along one edge extending across the base between the ends thereof and lying flat on the surface of the base, a central portion raised above the surface of the base and front and side edges extending down and over the front and side edges of the base to protect these latter edges from the weather, and filling material between the central raised portion of the shell and the base supporting the shell and securing it to the base.

3. A thick-butt metal-clad roofing element comprising the combination of a base of non-metallic material resistant to water, a shell of thin metal overlying one end of the base and having the portion along one edge lying flat upon the surface of the base between the ends thereof, this portion extending across the base, the other end of the shell extending down to overlie the end of the base with the remainder of the shell between its ends raised above the surface of the base, a filling material between the raised portion of the shell and the base supporting the shell and securing it to the base, and a tab formed as an extension of one lateral margin of the shell projecting beyond the side edge of the base and lying substantially in the plane of the lower surface thereof.

4. A roofing element comprising the combination of a base of non-metallic material resistant to water, a shell of thin metal overlying one end of the base, and a cover layer of water-resistant material applied to the other end of the base and overlying the rear edge of the shell.

5. A roofing element comprising the combination of a base of non-metallic material, a thin metallic shell overlying one end of the base and having the portion thereof along one edge lying flat upon the surface of the base and the portion thereof at its opposite edge overlying one end edge of the base, the shell having its central portion raised from the surface of the base, a filling in the space between the central portion of the shell and the top surface of the base, and a sheet of non-metallic, water-resistant material secured upon the face of the other end of the base with one edge overlying that portion of the shell which lies flat upon the surface of the base.

6. A roofing element comprising a base of non-metallic material resistant to water, a metal shell having a concave portion into which the end of the base projects, to conceal that end of the base and also the edges of the base at that end, the base and the shell being in spaced relation, a transverse portion extending rearwardly from the rear edge to the shell and lying in an off-set relation to the upper surface of the shell, this transverse extension lying in contact with the surface of the base, and a cover plate of a non-metallic material resistant to water covering the rear end of the base and having its front edge abutting against the off-set portion of the shell to conceal the extension thereon.

7. A roofing element comprising the combination of a base of non-metallic material resistant to water, a metal shell affixed to the base to cover one end of the latter, including the edges defining this end, this shell having a portion lying in spaced relation to the surface of the base and another portion lying in contact with the surface of the base, the latter portion being connected to the former by an off-set flange, a cover plate of a non-metallic material resistant to water overlying the rear end of the base and the portion of the shell which lies in contact therewith, a body of filling material of an adhesive plastic character interposed between the base and the main body of the shell, and a metallic tab projecting beyond the edge of the base along one side thereof.

8. A roofing element comprising the combination of a base of non-metallic material resistant to water having cut-out portions in one edge defining a plurality of tabs, a shell of thin metal overlying the end of the base in the edge of which the cut-out portions are formed, this shell having depressed portions along one edge which enter and bridge the cut-out portions of the base, and having its opposite edge lying flat upon the surface of the base, while the central portion of the shell is raised above the surface of the base, and a filling between the raised portion of the shell and the surface of the base.

9. A roofing element comprising the combination of a base of a non-metallic material resistant to water having cut-out portions in one edge, a metal shell affixed to the base and covering the said edge, this shell having depressed areas corresponding in position to the cut-out portions of the base and also having its opposite edge lying in contact with the surface of the base, substantially all of the remainder of the shell lying spaced from the surface of the base, and a cover layer to cover that portion of the surface of the base not covered by the metal, this cover layer overlying that portion of the shell which lies in contact with the surface of the base.

10. A roofing element comprising the combination of a base of a non-metallic material resistant to water having cut-outs in one edge, a metal shell affixed to the base to cover a portion of the surface of the latter, this shell having a rear extension lying in contact with the surface of the base and having depressed areas in corresponding position to the cut-outs, substantially all of the remainder of the shell lying in spaced relation to the base, a filling material of an adhesive character interposed between the spaced portions of the shell and the base, and a cover layer applied to the surface of the base and having a portion overlying that part of the shell which lies in contact with the base.

11. A roofing element comprising the combination of a base of a non-metallic material resistant to water, having cut-outs in one edge, a metal shell affixed to the base to cover a portion of the surface of the latter, this shell having a rear extension lying in contact with the surface of the base and having depressed areas in corresponding position to the cut-outs, substantially all of the remainder of the shell lying in spaced relation to the base, a filling material of an adhesive character interposed between the spaced portions of the shell and the base, a cover layer applied to the surface of the base and having a portion overlying that part of the shell which lies in contact with the base, and a metallic tab projecting beyond the base along one edge thereof.

12. A thick-butt metal-clad roofing element comprising the combination of a base of non-metallic material resistant to water having spaced cut-out notches extending inwardly from one edge thereof to define tabs, a metallic shell overlying the base at the end having the tabs, this shell having a flat portion along one edge extending across the base in contact therewith beyond the inner ends of the notches, and having portions overlying the tabs which are raised above the surface of the base, the shell being depressed between the said portions with the depressed areas lying in and bridging the notches in the base, the other end of the shell covering the end edges of the base in which the notches are formed, and filling material lying between the raised portions of the shell and the surfaces of the tabs, this filling material supporting the shell and securing it to the base.

In testimony whereof I affix my signature.

THOMAS ROBINSON.